June 22, 1965   JEAN-PIERRE M. E. DE GRAEF   3,191,180
CONTROL SYSTEM FOR TAPE UNIT Filed June 16, 1961   8 Sheets-Sheet 1

FIG. 1   FIG. 2

Inventor:
Jean Pierre Martin Emile De Graef
By Baldwin & Wight
Attorneys

United States Patent Office 3,191,180
Patented June 22, 1965

3,191,180
CONTROL SYSTEM FOR TAPE UNIT
Jean-Pierre Martin Emile De Graef, Brussels, Belgium, assignor to Compagnie des Machines Bull (Société Anonyme), Paris, France
Filed June 16, 1961, Ser. No. 117,586
Claims priority, application France, June 22, 1960, 830,751
6 Claims. (Cl. 346—74)

The present invention relates to magnetic tape reading and writing apparatus employed as high-capacity storage means for numerical data. It concerns more particularly devices intended to drive a magnetic tape between the instant when the latter is wound on two reels mounted on the apparatus and the instant when the movements of the tape are under the control of a servosystem.

In magnetic tape apparatus forming part of a data processing installation, it is standard practice for the movements of the tape to be controlled by a servosystem which responds to the respective positions of two slack loops formed by the tape, the low portions of these loops being capable of moving vertically in two columns in which a certain air depression exists. Various sensing devices are known, which include those utilising light sources and photoelectric cells.

While a high-speed driving section is generally provided for rapid starting, drive at high constant speed and rapid stopping of the tape in front of a transducer head, the individual drive of the tape reels may operate with some time lag in relation to the driving section, precisely by reason of the variations in the length of the loops formed by the tape. In normal operation, the controls applied to the motors driving the reels by the servosystem are such that these variations have predetermined limits.

Hitherto, it has been necessary before setting the apparatus into normal operation (reading or writing operations) to manipulate the tape so as to form manually two slack loops of tape and to dispose them in their respective depression columns in such manner that their position is sensed by the position detectors of the normal servosystem.

Manipulation of the tape was also necessary for extracting the magnetic tape from the depression columns and for winding it on to one or both of the reels in order to remove them from the apparatus.

These operations were relatively long and delicate, above all in driving systems comprising gripping rollers, various guide members and one or more fixed magnetic heads. Moreover, the danger of deterioration or soiling of the tape was very great.

In order to obviate these disadvantages, the present invention is aimed at providing a magnetic tape apparatus or feeding machine with means adapted to eliminate any manipulation of the tape during the positioning of the latter in its normal path of travel and during its removal therefrom.

In accordance with a first aspect of the invention, the tape driving system has novel features relating to the arrangement and the co-operation of the members of which it is composed. These features are distinguished inter alia by the fact that the layer of magnetic oxide is not in contact with any part, except of course the transducer head. The latter is on the other hand mounted on a support by means of which it can be retracted, that is to say, removed from the plane of the normal path of the tape.

The high-speed driving section preferably comprises two normally stopped capstans which may be separately driven in an appropriate direction of rotation by means of individual high-speed electromagnetic clutches. Each capstan is formed with slots and a pneumatic depression applied selectively to the interior of the appropriate capstan ensures sufficient adhesion of the tape either for the drive or for the maintenance at standstill, depending upon whether the capstan is rotating or is itself stopped by a brake also of electromagnetic form.

In accordance with another aspect of the invention, the tape apparatus is provided with means adapted to ensure automatic movement of the tape reels outside the control of the main servosystem, but under the control of particular tape position detectors.

In order to cause the tape automatically to descend from the reels so as to form two loops in the depression columns, manually controlled members initiate the rotation of the tape reels in opposite directions while the depression is applied to the capstans. Two loop position detectors cause the respective motors of the corresponding reels to be subjected to the control of the main servosystem when the lower parts of the loops reach a predetermined level. The placing in operation of the main servosystem causes the multiple head to be effectively brought into contact with the tape which is then stretched between the two stopped capstans.

Finally, in order to cause the tape to raise automatically from the depression columns and to rewind it on to the reels, manually controlled members interrupt the control of the tape movements by the main servosystem and initiate the retraction of the multiple head and of its support, as also the slow rotation of the two tape reels in opposite directions. A tape position detector controls the stopping of the reel motors as soon as the slack length of tape has risen above a predetermined level.

For a better understanding of the invention and to show how it may be carried into effect, the same will now be described, by way of example, with reference to the accompanying drawings, in which.

Figure 1:
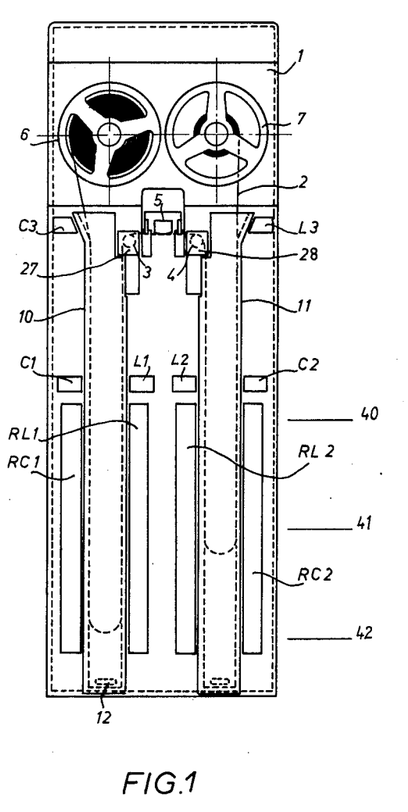
FIGURES 1 and 2 are, respectively, a front view and a corresponding side view of the front panel of the tape apparatus, with the driving members.
Figure 2:
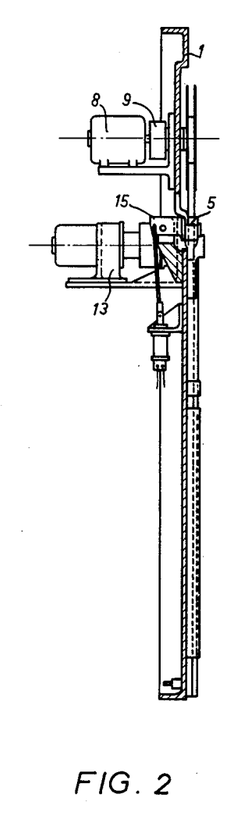

Referring to FIGURES 1 and 2, there will be seen the various tape driving members mounted on a front panel 1 of the apparatus. In normal operation, a magnetic tape 2 is driven at constant speed by one of two capstans 3, 4 so as to pass under a magnetic head 5. It will be stated that the tape is driven in the "forward" direction when it moves under the head from left to right. Of the two tape reels intended for storing the rolls of tape, the reel 6 is called the "supply reel" and the reel 7 the "take-up reel." Each of these reels can be rotated by an individual electric reel motor, such as 8, if desired through a speed reduction mechanism diagrammatically indicated at 9. In unwinding, the magnetic tape 2 leaves the supply reel and forms a loop which is lodged in a depression column 10. The tape forms a second loop which is lodged in a depression column 11 before becoming wound on to the take-up reel. The depression columns are constructed with plates of a transparent material and their rear face is formed of the front panel 1 itself. Below the loops, the air is sucked through apertures such as 12 communicating with an air depression source. Since the internal thickness of the depression columns is just sufficient to permit sliding of the magnetic tape, the upper face of the latter is subjected to atmospheric pressure, the pressure difference ensuring a constant tape tension.

There will be seen at 13 a mechanism for the rotation of a capstan. This mechanism comprises a constant-speed electric motor and electromagnetic clutch and brake devices ensuring rapid acceleration and deceleration of the tape. Since these devices are well known, they will not be described in detail.

Figure 3A:
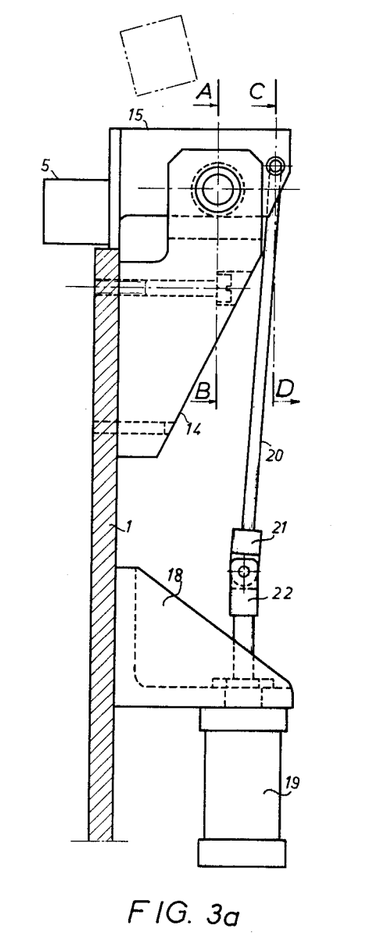
FIGURES 3a, 3b and 3c are detailed views of the devices for positioning the magnetic head.
Figure 3B:
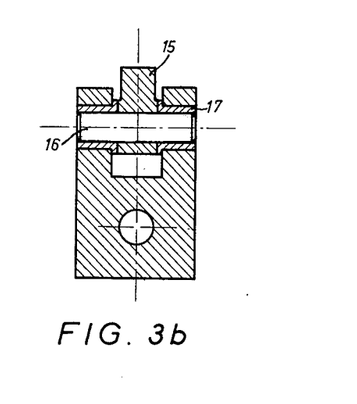
Figure 3C:
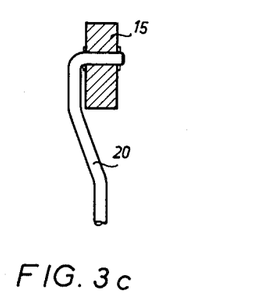

The head positioning mechanism is illustrated in greater detail in FIGURES 3a, 3b and 3c. A fixed support 14 is fixedly mounted on the front panel 1. It comprises two cheeks with bearings for the pivotal mounting of a rocking support 15. The magnetic head unit 5 is fixed on the rocking support 15 by any appropriate means so that it may be moved between a first and second position. A pin 16 (FIGURE 3b, section A-B) is fast with the support 15 and can turn in rings 17. A lower support 18 is mounted on the front panel and serves for securing the plunger electromagnet 19. The right-hand portion of the rocking support is formed with a link hole, which is conected to the rod of the plunger electromagnet by means of a bent rod 20, a male end member 21 and a female end member 22 which are coupled by a pin. The upper portion of the bent rod 20 may be seen in FIGURE 3c, section C-D.

In FIGURE 3a, the support 15 is in a position in which its lower portion is abutting a recess in the front panel. The head is then in the reading or writing position and the air gaps situated in the lower part are in contact with the magnetic tape. When the plunger electromagnet, i.e. electromagnetic actuator, is actuated so that the rod 20 is pulled downwards, the support 15 rocks and the head takes up a retracted position, as illustrated in dash-dotted lines in FIGURE 3a. In this latter position, the body of the head actuates a micro-switch (not shown), the function of which is to supply to the control circuits an indication of the position of the head, as will hereinafter be explained.

Figure 4A:
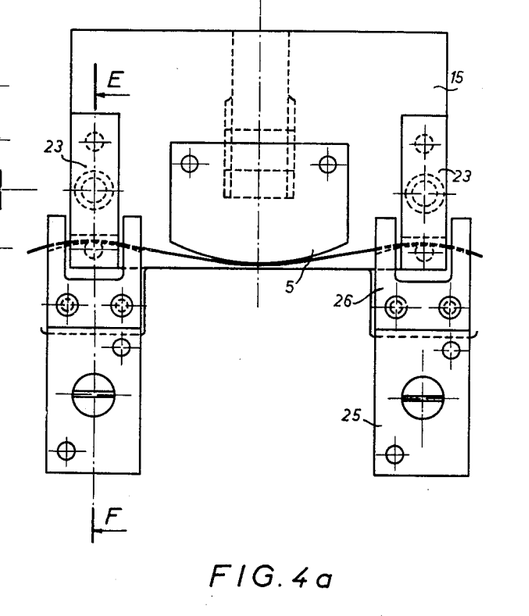
FIGURES 4a and 4b are detailed views of the head support and of the tape guides.
Figure 4B:
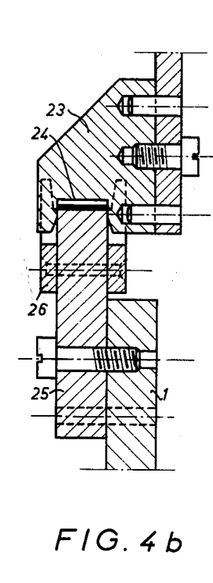

It will be seen from FIGURE 4a that two guides 23 for the tape are fixed on two lugs on the rocking support 15 on either side of the head 5. The guide recess 24 is scarcely wider than the maximum width of the tape in order that the latter may be very accurately guided in relation to the air gaps of the multiple head. Two other guide blocks 25 are fixed to the front panel 1. Each of them comprises two plates 26 which are machined to effect an approximate guiding of the tape when the latter is placed in position and the head is retracted.

Figures 5A, 5B:
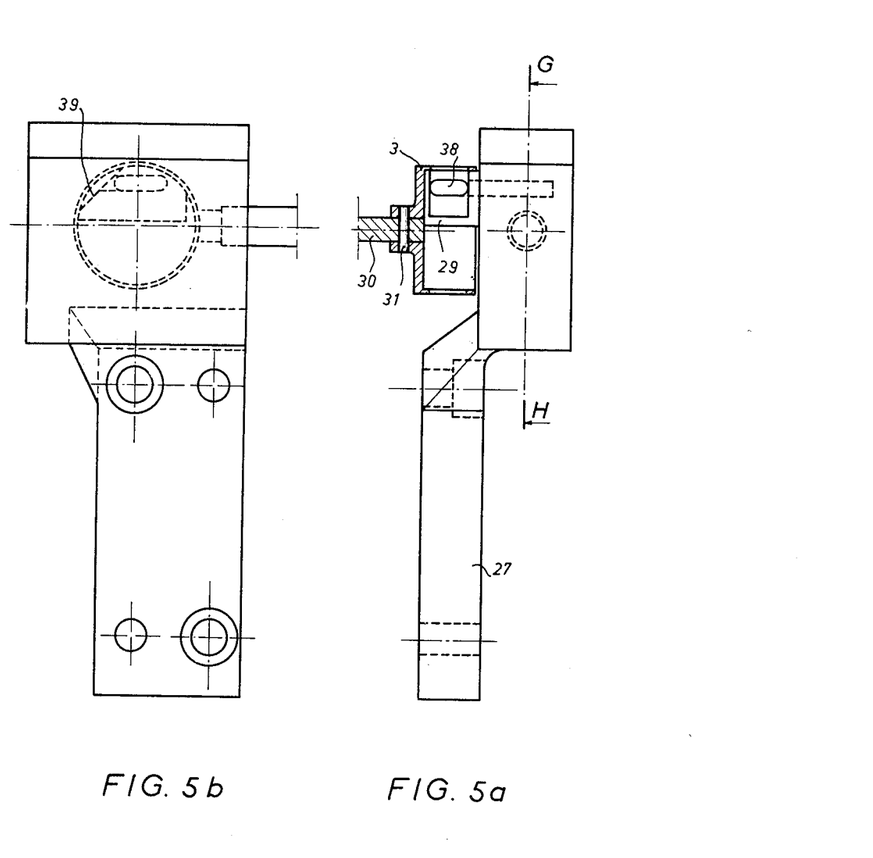
FIGURES 5a, 5b and 5c are detailed views of a depression change-over member.
Figure 6:
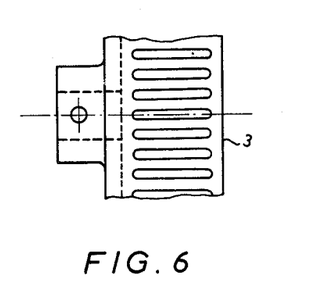
FIGURE 6 is a detailed view of a capstan.

There will be seen in FIGURE 1 two depression change-over devices 27 and 28 which co-operate with the capstans 3 and 4. FIGURES 5a and 5b are detailed views of the left-hand change-over device 27, the right-hand change-over device being symmetrical therewith. An end member 29 machined in the body of the change-over device 27 comprises a circular surface circumscribed by the capstan 3. The latter is connected to a driving shaft 30 by a pin 31. The skirt of the capstan 3 (see FIGURE 6) is formed with slots situated very close together, which extend over a length smaller than the width of the tape. The latter may be equal to 12.7 mm.

Figure 5C:
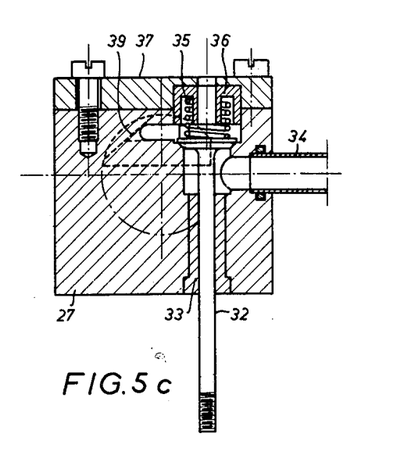

Referring to FIGURE 5c, which corresponds to the section G—H (FIGURE 5a), an internal chamber is formed in the body of the change-over device 27. A conical-seated valve 32 is disposed in this chamber and is provided with a screw-threaded stem guided by the bushing 33. A pneumatic depression is set up in the chamber by way of a tube 34. A spring 35 bears against the cup-shaped member 36, which is maintained in position by the cover 37. An aperture 38 (FIGURE 5a) communicates by way of an internal duct with the chamber in the body. The end member 29 has a plane surface, the profile of which is shown at 39. When the tape is in contact with the upper left-hand quarter-circle of the capstan, the zone situated between the interior of the skirt and the said surface can be subjected either to atmospheric pressure or to the air depression emanating from the tube 34. In the drawing of FIGURE 5c, the spring 35 applies the valve 32 against its seat and consequently the said zone is subjected to atmospheric pressure by reason of the fact that the aperture communicates with the atmospheric air through the hole in the cup-shaped member 36 and the cover 37. On the other hand, when the valve is actuated, that is to say, when it is lifted so that its upper portion abuts the cup, the said zone is subjected to the depression emanating from the tube 34, and the tape is applied strongly against the capstan by the pressure difference.

The screwthreaded portion of the valve is intended for coupling to an end member for the purpose of mechanically connecting it to a plunger electromagnet which is not shown, but which may be of the same type as that illustrated in FIGURE 3a. The control circuits of such elements may be of any appropriate known type and are therefore not illustrated in detail.

In the course of normal operation, the reversals of the driving direction of the tape are relatively rare and, for example, for unwinding in the forward direction, the valve of the change-over device 28 (FIGURE 1) is constantly lifted. When the capstan 4 is stopped, the tape is applied against the latter and therefore cannot move in relation to the head 5. When the capstan is in rotation, the force of adhesion of the tape to the capstan is sufficient to overcome the friction of the tape on the head, on the guides and in the depression columns. For this direction of travel, the capstan 3 is stopped and is not subjected to the depression.

It may be noted that the number of parts capable of rubbing on the tape and above all on the oxide layer is minimised. In addition, no moving part can add its inertia to that of the tape so as to reduce the acceleration which it is necessary to impart to the latter. The use of devices comprising gripper rollers adapted to be selectively actuated and the elimination of the depression in the capstans may be envisaged, but this would complicate the construction by reason of the necessity to retract the gripper rollers during the automatic downward and upward movements of the magnetic tape.

Referring to FIGURE 1, the light source RL1 and RL2 have the form of elongated banks and are situated close to the lower portions of the depression columns 10 and 11 respectively. The banks of photoelectric cells or first light responsive devices RC1 and RC2 are situated at the same level and constitute the devices for sensing the position of the tape and controlling the main servosystem which governs the movements of the tape reels for the reading, writing and rewinding operations. The photo-resistive cells or second light responsive devices C1 and C2 co-operating with the light sources L1 and L2 constitute first light responsive devices for sensing the position of the tape loops during the automatic downward movement at low speed of the tape in the depression columns. The photo-resistive cells C3 co-operating with the light source L3 constitutes a device for sensing the position of the tape during the automatic low-speed upward movement of the tape. The photo-resistive cells, or second light responsive device C1, C2 and C3, are located substantially along the tape path between the reels and the tape drive capstans.

There have been symbolically represented by three lines 40, 41, 42 three typical levels for the sensing of the tape loops in relation with the main servosystem, namely a high level 40, a medium level 41 and a lower level 42 respectively.

Figure 7:
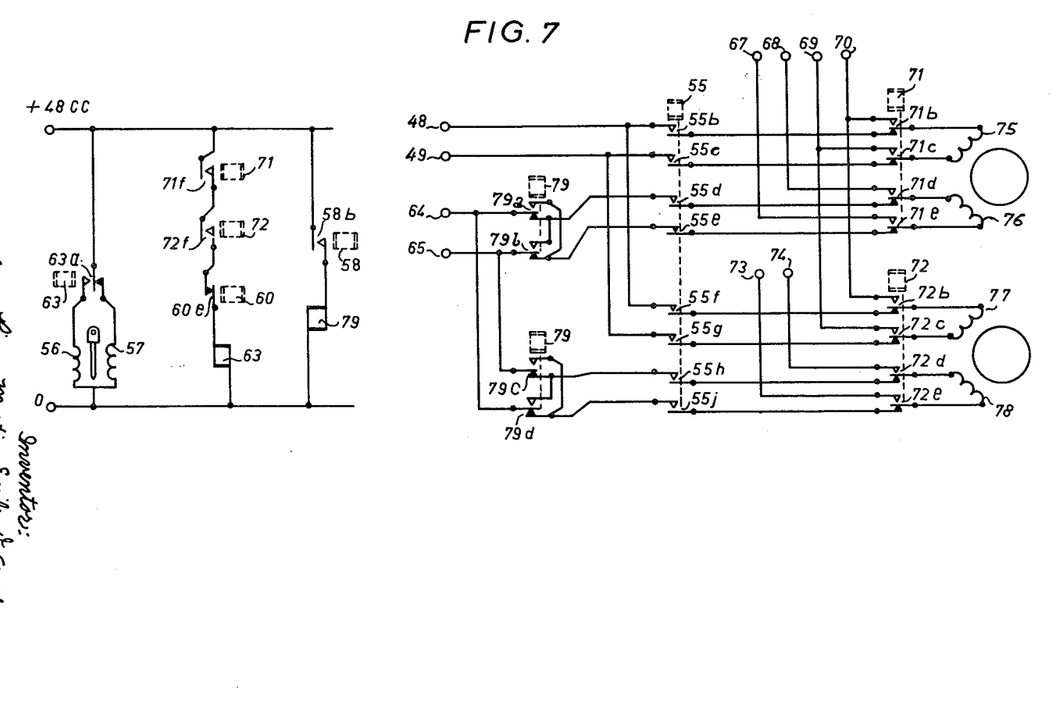
FIGURE 7 is a diagram of control circuits notably for feeding the reel motors.

The control circuits co-operating in the apparatus for carrying out the invention will first be considered with reference to FIGURE 7. Each of the reel motors is of a two-phase alternating-current type having variable speed and reversable direction of rotation. The motor of the supply reel has a first winding 75 and the motor of the take-up reel has a first winding 77. 76 and 78 are the respective second windings of these motors.

During normal regulated or servo-controlled operation, the reversing contacts 71b to 71e and 72b to 72e are reversed, so that the first windings 75 and 77 constantly receive from the terminals 69 and 70 an alternating voltage from a second voltage source of predetermined maximum amplitude. However, the windings 75 and 77 do not produce any driving torque by themselves. Referring to the second winding 76 of the left-hand motor, this winding can receive through the reversed contacts 71d and 71e a variable alternating voltage from the terminals 67, 68. The amplitude of this voltage is controlled by the servosystem operating under the control of the banks of cells RC1. If, for example, the bottom of the tape loop occupies a high level, such as 40 in the left-hand column, the cells RC1 are illuminated to the maximum extent and the second winding is fed by a high voltage, owing to which the driving torque and the speed are high. This voltage decreases in proportion as the bottom of the loop descends and when it reaches the medium level the voltage in question becomes zero, so that the motor stops. If the bottom of the tape loop descends further than the medium level, the voltage supplied by the terminals 67, 68 is reversed and the motor then rotates in the opposite direction. The second winding 78 of the right-hand motor can be fed in turn from the terminals 73, 74. The operation of this motor is similar to that of the preceding one, except that it must wind the tape at maximum speed when the tape loop tends to descend towards the bottom level (42) in the right-hand column.

During low-speed operation, that is to say, during the automatic descending and rising operations of the tape, the reels must be driven at low speed and in opposite directions to one another.

During these latter operations, the contacts 71b to 71e and 72b to 72e remain in their inoperative position, while the contacts 55b to 55j are closed. The manner in which they are controlled will hereinafter be indicated. There are available at this instant at the terminals 48, 49 and 64, 65 voltages which are in opposition and have a low fixed amplitude which limits the speed of the motors, for example to one-fifth of the maximum speed. The first windings 75, 77 receive this reduced voltage from the terminals 48, 49 through the contacts 55b, 55c on the one hand and 55f, 55g on the other hand. During the descent of the tape, the second winding 76, for example, receives a reduced voltage from the terminals 64, 65 through the contacts 79a, 79b (normal), 55d, 55e (closed) and 71d, 71e (normal). It may be noted that as a result of the reversed connection of the conductors connecting the movable blades of the contacts 79c, 79d to the terminals 64, 65, the motor of the take-up reel rotates clockwise, while the motor of the supply reel rotates forwards or anticlockwise.

During the automatic upward movement of the tape, the relay 55 is also energised, as also is the relay 79, as will hereinafter be explained in greater detail. Owing to the reversal of the contacts 79a to 79d, the supply reel rotates in the clockwise direction and the take-up reel rotates in the counter-clockwise direction.

The relay 63 (FIGURE 7) serves to control the positioning of the transducer head. It cannot be energised during the automatic downward and upward movements of the tape, because its circuit between the terminals +48 CC and 0 cannot be completed during these operations. Its contact 63a then remains in the open position and it may be seen that the winding 57 of the plunger electromagnet is energised. This is the plunger electromagnet 19 illustrated in FIGURE 3a. When the winding 57 is energised, the plunger is pulled downwards and it follows that the head occupies the raised or retracted position. When the reel motors are subjected to the control of the main servosystem, the contacts 71f and 72f are closed and the relay 63 is energised. The reversal of the contact 63a now produces the energisation of the winding 56. The plunger of the electromagnet 19 is pulled upwards, the rocking support rocks and the multiple head is brought into the operative position in contact with the magnetic tape.

Figure 8:
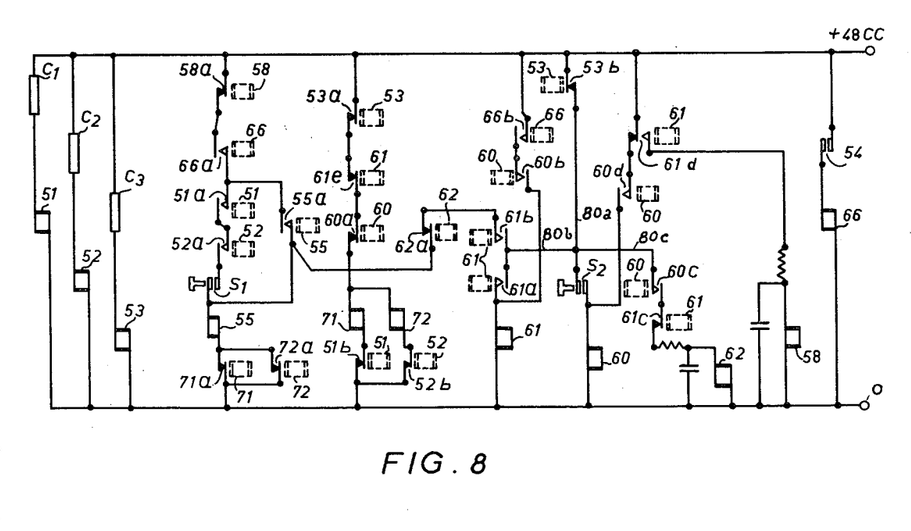
FIGURE 8 is a diagram of control circuits, in operation for the automatic lowering and raising of the tape.

Terminals marked +48 CC have been indicated by way of example in FIGURES 7 and 8. The relays employed operate normally at a direct voltage of 48 volts. In FIGURE 8, each of the members C1, C2, C3 is a selenium photoresistive cell. Each cell is wired in series with a relay 51, 52, 53. When a cell is strongly illuminated by a light source, its resistance is very low and permits the passage of the normal energising current into the winding of the associated third relay operated switching means. On the other hand, when the cell receives no light, its resistance becomes so high that the circuit of the relay winding can be regarded as having been broken. It is sufficient to refer to FIGURE 1 in order to recall the respective positions of the cells C1, C2, C3 in the apparatus.

The relay 53 has the object of controlling the low-speed drive of the tape reels. In addition to the contacts 55b to 55j (FIGURE 7), it controls a holding contact 55a (FIGURE 8). The relays 71 and 72 have essentially the function of controlling the passage of the reel movements under the control of the main servosystem, which is in turn supervised by the banks of cells RC1 and RC2, for the right-hand and left-hand depression columns respectively.

The normally closed contacts 51b, 52b are inserted on one side of the energising circuits of the relays 71 and 72 respectively. These contacts are open when the cells C1 and C2 are illuminated. Therefore, neither of the relays 71 and 72 can be energised before the corresponding contact 51b, 52b is re-closed.

The switch S1, which may be manually closed, serves to energise the relay 55 and to initiate the automatic downward movement of the tape at low speed. The relay 60, when energised as a result of the closing of the manually operated switch S2, serves to initiate the automatic lifting or retraction of the transducer head. When the head is lifted, the relay 61 becomes operative to control the energisation of the relay 55 and the automatic raising of the tape. The latter movement is stopped as soon as the relay 53 is re-energized. The relay 58 controls through its contact 58b the energisation of the relay 79 (FIGURE 7), which controls the reversal of the direction of rotation of the reel motors. The relay 58 also has a time delay function through its contact 58a, since it is shunted by a condenser to delay the opening of its contacts after its energisation circuit has been broken. A resistance inserted in series limits the current charging the condenser. The relay 62 also has a time delay function, the object of which will hereinafter be explained. Finally, the relay 66 may be energised only during the closing of the contact 54, which is the previously mentioned micro-switch and which is closed when the transducer head is in the retracted position.

The operation of the apparatus for the positioning or automatic downward movement of the tape will now be considered, assuming that the tape is wound on the supply and take-up reels.

Figure 9:
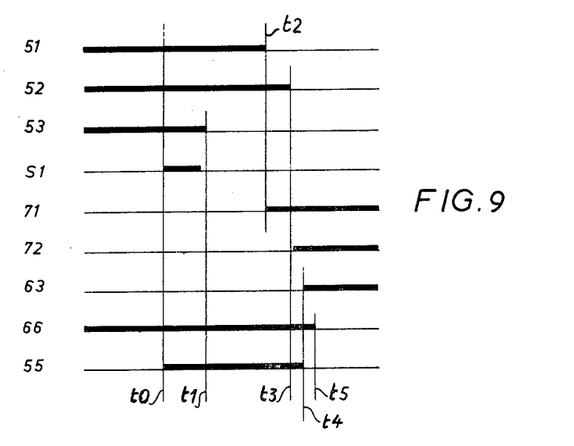
FIGURES 9 and 10 are time graphs relating to the operation of the circuits of FIGURE 8.

Before the instant $t_0$ (FIGURE 9), the state of the circuits is as follows: the contact 58a remains closed; 66a is closed because the micro-switch 54 is closed by the head support in the retracted position; the cells C1, C2, C3 being completely illuminated, the relays 51, 52 and 53 are energised and the contacts 51a, 52a are therefore closed. The contacts 71a and 72a remain closed because the relays 71 and 72 cannot be energised at this instant. On the other hand, the contacts illustrated in FIGURE 7 are in the positions illustrated by the drawing and the winding 57 of the electromagnet for positioning the head is energised.

It is therefore sufficient to close the switch S1 by manual depression of the corresponding push button for producing the energisation of the relay 55. The latter is maintained in the energised state by its contact 55a, so that the switch S1 can be opened again without disadvantage.

The closure of the contacts 55b to 55j (FIGURE 7) permits feeding of the second windings of the reel motors, whereby the latter are slowly rotated in opposite directions, as previously indicated. The tape unwinds from each of the reels and the slack length which it forms descends and intercepts the light from the lamp L3, so that the cell C3 is no longer illuminated. Therefore, at the instant $t_1$ the relay 53 is de-energized. The contacts 53a and 53b (FIGURE 8) close again without having any effect for the instant. The slack length of the tape continues to descend and, when the central portion thereof has been stopped against the capstans by the depression obtaining therein, it is obvious that one of the tape loops will be formed more quickly than the other while descending in the corresponding depression column. Thus, the bottom of the left-hand loop of the tape is the first to reach the level of the cell C1, thus intercepting the light from the lamp L1. Therefore, at the instant $t_2$ (FIGURE 9), the relay 51 is no longer energised. The reclosing of the contact 51b immediately produces energisation of the relay 71. Reversal of the contacts 71b–71e produces the change-over of the motor of the supply reel from low-speed rotation to high-speed rotation under the control of the servosystem operative during normal operation. This motor will automatically be stopped when the left-hand loop of the tape reaches the centre level 41 (FIGURE 1).

The motor of the take-up reel has continued to rotate, and at the time $t_3$ the bottom of the tape loop in the right-hand depression column entirely masks the cell C2, thus causing de-energisation of the relay 52. Reclosing of the contact 52b produces energisation of the relay 72 and consequently brings the motor of the take-up reel under the control of the servo-controlled driving system, which will stop it in the manner hereinbefore indicated.

From the instant $t_4$, the simultaneous opening of the contacts 71a and 72a interrupts the energising circuit of the relay 55, thus producing the opening of the contacts 55a and 55b to 55j. The contacts 71f and 72f both being closed, they complete an energising circuit for the relay 63 (FIGURE 7), which reverses its contact 63a. At the instant $t_5$, the winding 57 is de-energised, while the winding 56 of the head positioning electromagnet is now energised, and the head support is driven towards its operative position, in which the head is in contact with the tape. On commencement of the movement of the head support, the micro-switch 54 is opened, thus interrupting the energisation of the relay 66, which opens its contact 66a. The relay 55 therefore can no longer be energised as long as the transducer head is maintained in the operative position. It will be observed from FIGURE 9 that the time intervals $t_3$–$t_4$ and $t_4$–$t_5$, which are response times of relay contacts, are drawn to a larger scale than the other time intervals.

It has been noted that, for each of the left-hand and right-hand tape loops, the associated elements such as C1, 51 on the one hand and C2, 52 on the other hand, constitute two auxiliary servo-control devices whose operation is essential for the automatic downward movement of the tape. At the commencement, they prevent by means of their contacts 51a and 52a in series the unwinding of the tape if one of the relays 51 and 52 is not energised, and at the end each of them enables the main servosystem to take over the separate movements of the tape reels by means of the contacts 51b and 52b.

The apparatus is now ready to receive a normal running order in order to carry out one of the reading, writing or rewinding operations with drive of the tape in the appropriate direction.

There will now be considered the instant when it is decided to rewind the tape automatically on to the reels, one of the aforesaid operations having just been stopped, while the main servosystem is still operative. The tape loops have each stopped at the medium level indicated by 41 (FIGURE 1).

Figure 10:
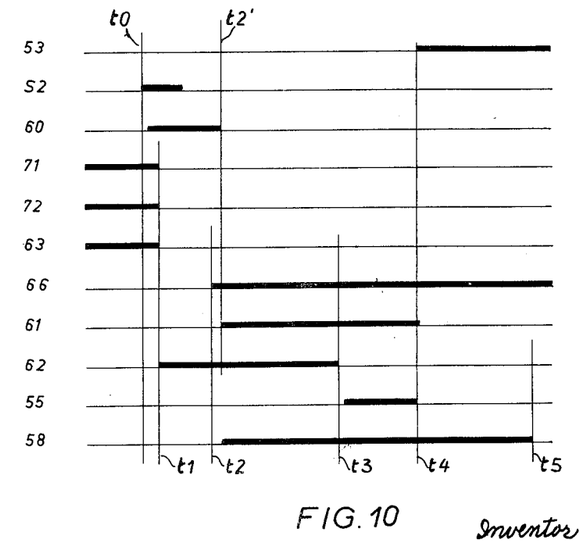

Reference will be made to FIGURES 7, 8 and 10. Before the instant $t_0$, the cells C1, C2, C3 are not illuminated and the relays 51, 52 and 53 are not energised. On the other hand, the relays 71, 72 and 63 are energised. The transducer head is still in the operative position.

Closing of the manually operated switch S2 has the effect of energising the relay 60 through the closed contact 53b and the conductor 80a. Energisation of the relay 60 brings about; (1) opening of the contact 60a, which breaks the energising circuit of the relays 71 and 72; (2) closing of the contact 60b, which momentarily has no effect; (3) closing of the contact 60c, which brings about energisation of the relay 62, with a slight time lag due to the presence of the condenser; (4) closing of the holding contact 60d, which permits 60 to remain energised through the contact 61d normal; (5) opening of the contact 60e, which interrupts the energisation of the relay 63 before the opening of the contacts 71f, 72f is effective. From this instant, the switch S2 can be released and reopened.

As a result of (5), at the time $t_1$ the contact 63a returns to the open position, the winding 56 is deenergised and the winding 57 is energised, which results in the raising movement of the multiple head. When the latter reaches the completely retracted position, it causes closing of the micro-switch 54, which brings about energisation of the relay 66 at the instant $t_2$. Closing of the contact 66b has the effect of completing an energising circuit for the relay 61 through the already closed contact 60b. Energisation of the relay 61 results in closing of the contact 61a, which ensures maintenance of the energisation of 61 through the closed contact 53b and the conductors 80a and 80b. The closing of the contact 61b is momentarily ineffective. The reversal of the contact 61d has the effect of permitting energisation of the relay 58 and breaking the energising circuit of the relay 60 at the instant $t_2'$. Finally, opening of 61c interrupts the energisation of the relay 62.

It is to be noted that from the instant $t_1$ the opening of the contact 62a had prevented the establishment of an energising circiut for the relay 55. By reason of the discharge of the condenser in parallel with the winding of the relay 62, its contact 62a closes again only after a predetermined lapse of time, which may amount to one second. From this instant ($t_3$), an energising circuit for the relay 55 is established as follows: terminal +48 CC, closed contact 53b, conductors 80a, 80b, contacts 61b (closed) and 62a, coil of the relay 55, normally closed contacts 71a, 72a, to the terminal 0.

However, in order that the relay 55 may not be able to remain energised through the action of its own contact 55a, but that its energisation may pass under the control of the cell C3, opening of the contact 58a occurs in order to render ineffective the closing of the contact 55a. It may be noted that the opening of the contacts 60a and then 61e has prevented energisation of the relays 71 and 72. On the other hand, closing of the contact 58b (FIGURE 7) has caused energisation of the relay 79, which has reversed its contacts 79a to 79d.

When the contacts 55b to 55j are closed, the reels are driven by their motors at low speed in the same way as during the downward movement of the tape. However, by reason of the reversal of the contacts 79a to 79d the second windings of the motors are fed so that the supply reel turns in the direction opposite to its normal direction and the take-up reel turns in its normal direction.

The tape loops rise in their depression columns, and first one and then two of the cells C1 and C2 are unmasked and fully illuminated, but the energisation of the relays 51, 52 is now ineffective. When the loops leave the depression columns, the slack length of tape which then forms continues to rise until the instant when the light from the lamp L3 is no longer intercepted by the tape, and the cell C3 is again fully illuminated.

This immediately results in energisation of the relay 53 at the instant $t_4$, and consequently the opening of the contact 53a prevents possible energisation of the relay 71 or 72, and opening of the contact 53b breaks the holding circuit of the relay 61. Since the latter is no longer energised, the opening of the contact 61b breaks the energising circuit of the relay 55 and the return of the contact 61d to the open position interrupts the energising circuit of the relay 58. When the contacts 55b to 55j are open, the second windings of the reel motors are no longer fed. However, since at least one of the reels does not stop immediately, the loop of the tape rises distinctly above the level of the cell C3.

The condenser shunting the coil of the relay 58 has the effect of prolonging its energisation from the return of the contact 61d to the inoperative position until the instant $t_5$. The delay in the opening of the contact 58a is fixed between a half second and one second and has the result that further actuation of the switch S1 cannot cause energisation of the relay 55 during this period of time.

It will have been observed that, although two separate auxiliary servosystems are provided to control the movements of the two reels respectively for the automatic downward and upward movements of the tape, the low-speed rotation of the reel motors is controlled by a common control device consisting essentially of the relay 55 of FIGURE 8 which connects the reel motors to a first voltage source. Like all the other relays which have to control a number of contacts, the relay 55 may be replaced by a number of relays connected in parallel, depending upon the number of contacts controlled by each relay.

I claim:

1. In a magnetic tape feeding machine having two variable speed reversible electric reel motors for driving tape supply and take-up reels, a first and a second voltage source and a system for servo-regulation of said reel motors with two first light-responsive devices located to survey the position of two bights of tape in the lower portions of two air depression columns during recording and reproducing operations; a further control means including
   a first relay-operated switching means which when energized connects said reel motors with a first voltage source whereby said reel motors slowly drive said reels in a direction to unwind tape from both of said tape reels;
   second relay-operated switching means which when energized connects said reel motors to said second voltage source through said servo-regulation system, said servo-regulation system being controlled by said first light-responsive devices;
   second light-responsive devices located at a level just ahead of said first light-responsive devices for each surveying the bight of a tape in a corresponding column; and
   third relay-operated switching means controlled by said second light-responsive devices to energize said second relay-operated switching means whereby when a bight of tape goes beyond said second light-responsive devices, the corresponding reel motor drives said tape supply and take-up reels at full speed under control of said first light-responsive devices.

2. A tape feeding machine according to claim 1 and including
   a head unit mounted to be rocked between a first and a second position;
   an electro-magnetic actuator mechanically coupled to said head unit for normally maintaining said head unit in said first position out of the tape path; and
   electro-magnetic actuator relay means for controlling the operation of said electro-magnetic actuator,
   said electro-magnetic actuator relay means being operable by said second relay-operated switching means, whereby energization of said electro-magnetic actuator relay means by said second relay-operated switching means causes the electro-magnetic actuator to move the head unit into a second position for transducing.

3. In a magnetic tape feeding machine having two variable speed reversible electric reel motors for driving tape supply and take-up reels, a first and a second voltage source, a system for servo-regulation of said motors with two first light-responsive devices located to survey each the positions of a bight of tape in the lower portion of an air depression column during recording and reproducing operations, and two tape drive capstans; further control means including
   first relay-operated switching means which when energized connects said reel motors with said first voltage source whereby said reel motors slowly drive said reels in a direction to wind tape on both of said tape reels;
   second relay-operated switching means which when energized connect said reel motors to said second voltage source through said servo-regulation system, said servo-regulation system being controlled by said first light-responsive devices;
   control relay means adapted to be manually operated and whereby operation will render said second relay-operated switching means inoperative and render operative said first relay-operated switching means;
   a second light-responsive device located substantially between said tape reels and said tape drive capstans for sensing the presence of a bight of tape; and
   a third relay-operated switching means controlled by said second light-responsive devices to deenergize said first relay-operated switching means when the bight of tape goes beyond said second light-responsive device.

4. A tape feeding machine according to claim 3 and including
   a head unit mounted to be rocked between a first and a second position;
   an electro-magnetic actuator mechanically coupled to said head unit for normally maintaining said head unit in said first position out of the tape path; and
   an electro-magnetic actuator relay means for controlling the operation of said electro-magnetic actuator, said electro-magnetic actuator being excited by said electro-magnetic actuator relay means concurrently with the operation of said second relay-operated switching means for causing said electro-magnetic actuator to maintain said head unit in its second position for transducing; and wherein said control relay means is operable for de-energizing said electro-magnetic actuator means, thereby causing said head unit to be returned to the first position.

5. A tape feeding machine according to claim 4 including retardation relay-controlled contacts for delaying the operation of said first relay-operated switching means until said unit has been returned to said first position.

6. In a magnetic tape feeding machine having two variable speed reversible electric reel motors for driving tape supply and take-up reels, a first and a second voltage source, a system for servo-regulation of said reel motors with two first light-responsive devices located to survey the positions of two bights of tape in two air depression columns during recording and reproducing operations and two tape drive capstans, further control means including first relay-operated switching means which when energized in one position connects said reel motors with said first voltage source whereby said reel motors slowly drive said reels in a direction to wind tape on both of said tape reels and which when engaged in another position connects said reel motors with said first voltage source whereby said reel motors drive said reels in a direction to unwind tape from both of said tape reels;

second relay-operated switching means which when energized connects said reel motors to said second voltage source through said servo-regulation system, said servo-regulation system being controlled by said first light-responsive devices;

a head unit mounted to be moved between a first and a second position;

an electro-magnetic actuator mechanically coupled to said head unit for normally maintaining said head unit in said first position out of the tape path;

an electro-magnetic actuator relay means for controlling the operation of said electro-magnetic actuator, said electro-magnetic actuator being excited by said electro-magnetic actuator relay means concurrently with the operation of said second relay-operated switching means for causing said electro-magnetic actuator to maintain said head unit in its second position for transducing;

control relay means adapted to be manually operated and whereby one operation will render said second relay-operated switching means inoperative and render operative said first relay-operated switching and energize said electro-magnetic actuator relay means, and another operation will render said second relay operated switching means operative and render inoperative said first relay-operated switching means and de-energize said electro-magnetic actuator relay means thereby causing said head unit to be returned to the second position for transducing;

a second light-responsive device located substantially along the tape path between said tape reels and said tape drive capstans for sensing the presence of a bight of tape; and a third relay-operated switching means controlled by said second light-responsive device to de-energize said first relay-operated switching means when the bight of tape goes beyond said second light-responsive device.

References Cited by the Examiner
UNITED STATES PATENTS 2,831,678  4/58  MacNeill _____________ 242—55.12
2,862,781  12/58  Baumeister ___________ 346—74
2,919,076  12/59  Buslik _______________ 242—55.12

IRVING L. SRAGOW, *Primary Examiner.*

E. JAMES SAX, *Examiner.*